(12) United States Patent
Elicker et al.

(10) Patent No.: US 12,540,643 B2
(45) Date of Patent: Feb. 3, 2026

(54) MOUNTING RAIL FOR MOUNTING A GUIDE CARRIAGE OF A LINEAR GUIDE ONTO A GUIDE RAIL

(71) Applicant: Schaeffler Technologies AG & Co. KG, Herzogenaurach (DE)

(72) Inventors: Thomas Elicker, Breittenbach (DE); Peter Heipt, St. Ingbert (DE); Thomas Becker, Jägersburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 121 days.

(21) Appl. No.: 18/683,845

(22) PCT Filed: May 30, 2022

(86) PCT No.: PCT/DE2022/100403
§ 371 (c)(1),
(2) Date: Feb. 15, 2024

(87) PCT Pub. No.: WO2023/020646
PCT Pub. Date: Feb. 23, 2023

(65) Prior Publication Data
US 2025/0122903 A1    Apr. 17, 2025

(30) Foreign Application Priority Data
Aug. 19, 2021 (DE) .......................... 102021121485.8

(51) Int. Cl.
*F16C 29/00* (2006.01)
*F16C 43/04* (2006.01)

(52) U.S. Cl.
CPC .......... *F16C 29/005* (2013.01); *F16C 29/002* (2013.01); *F16C 43/04* (2013.01)

(58) Field of Classification Search
CPC ...... F16C 29/00; F16C 29/002; F16C 29/005; F16C 29/08; F16C 43/00; F16C 43/04
See application file for complete search history.

(56) References Cited

U.S. PATENT DOCUMENTS

2010/0142867 A1* 6/2010 Chen ................... F16C 29/0602
384/49

FOREIGN PATENT DOCUMENTS

| DE | 4209441 A1 | 9/1993 | |
|----|-----------|--------|---|
| DE | 10227727 A1 | 1/2004 | |
| DE | 102012213973 A1 | 2/2014 | |
| DE | 102013210695 B3 | 11/2014 | |
| DE | 102015209311 A1 | 11/2016 | |
| DE | 102017203377 A1 * | 9/2018 | ............. F16C 43/06 |
| JP | 2016125600 A | 7/2016 | |

OTHER PUBLICATIONS

Machine Translation of DE-102017203377-A1 (Year: 2018).*

* cited by examiner

*Primary Examiner* — Alan B Waits
(74) *Attorney, Agent, or Firm* — Price Heneveld LLP

(57) ABSTRACT

Mounting rail for mounting a guide carriage of a linear guide onto a guide rail, having a mounting contour which has side faces formed on mutually averted longitudinal sides of the mounting rail and has a top face situated between the side faces and has bearing faces arranged at the end sides and transversely to the longitudinal axis for bearing against the guide rail. One bearing face has a chamfer at the transition to the side faces and to the top face. The other bearing face adjoins the side faces and the top face at an angle of 90 degrees.

11 Claims, 5 Drawing Sheets

MOUNTING RAIL FOR MOUNTING A GUIDE CARRIAGE OF A LINEAR GUIDE ONTO A GUIDE RAIL

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/DE2022/100403, filed on May 30 2022, designating the United States of America, which in turn claims the benefit of priority under 35 U.S.C. §§ 119, 365 of German Patent Application No. 102021121485.8, filed Aug. 19, 2021, the contents of which are relied upon and incorporated herein by reference in their entirety.

FIELD OF THE DISCLOSURE

The present disclosure relates to a mounting rail for mounting a guide carriage of a linear guide onto a guide rail.

BACKGROUND OF THE DISCLOSURE

Typically, a mounting rail is placed with its mounting head against the guide rail at the end side to actuate a switchable stop that allows the guide carriage to be moved from the mounting rail to the guide rail. If there is an edge at the transition from the mounting rail to the guide rail, the guide carriage rolls over this edge during the movement. If the guide carriage is fitted with end side wipers, these wipers can be damaged at this edge.

SUMMARY OF THE DISCLOSURE

The object of the present disclosure is to provide a mounting rail for a guide carriage which enables the guide carriage to be moved smoothly from the mounting rail to the guide rail and vice versa.

According to the disclosure, this object is achieved by the mounting rail described herein. Appropriate further developments are also provided herein.

The mounting rail for mounting a guide carriage of a linear guide onto a guide rail relates in particular to mounting rails for profile rail roller guides, the guide carriages of which are approximately U-shaped when viewed in cross-section and grip around the guide rail with their two legs. The legs of the guide carriages have raceways for rolling elements which, together with the raceways of the guide rail, form rolling element channels in which the rolling elements roll along. The raceways of the guide rail are formed on the mutually averted side faces of the guide rail.

Typically, the guide carriages of profile rail roller guides grip around the guide rail with their legs and, for mounting purposes, also around the mounting rail. On their facing longitudinal sides, the legs of the guide carriage have raceways for rolling elements, which are in each case arranged opposite one of the two side faces of the mounting rail. The raceways of the legs and the side faces of the mounting rail face one another. The rear of the guide carriage—which connects the two legs to one another-faces the top face of the mounting rail with its inner rear face. The rear back face and the top face are arranged opposite one another.

The mounting rail has a mounting contour that is adapted to the contour of the guide rail in order to move the guide carriage smoothly from the mounting rail to the guide rail and vice versa. The mounting contour has side faces formed on mutually averted longitudinal sides of the mounting rail, as well as a top face arranged between the side faces. The longitudinal sides support any rolling elements inserted in the guide carriage to prevent them from falling out. The top face is adapted to the top face on the guide rail side. In many cases, guide carriages are fitted with so-called front wipers, which grip around the guide rail and can rest against its longitudinal sides and top side.

The mounting rail has bearing faces arranged transversely to the longitudinal axis at the end sides for bearing against the guide rail. If the mounting rail is in perfect contact, the guide carriage can be moved onto the guide rail.

One bearing face of the mounting rail is provided with a chamfer at the transition to the side faces and to the top face, while the other bearing face adjoins the side faces and the top face of the other mounting head at an angle of 90 degrees, i.e., it is angular.

This arrangement offers the advantage of using the same mounting rail for two different types of guide rails: the first type, which is provided at the end side with a chamfer at the transition from the end face to the side faces and to the top face; and the second type, which adjoins at the end side at the transition from the end face to the side faces and to the top face at an angle of 90 degrees.

In the case of the first type of guide rail, the mounting rail is placed against the guide rail with the chamfered bearing face. The chamfers of the mounting rail and guide rail are matched to one another in such a way that no interfering edge is formed at the transition between the mounting rail and guide rail. During mounting, the wipers of the guide carriage initially slide into a free space that is approximately triangular in shape when viewed in a direction transverse to the guide rail; this triangle is formed by a plane in which the top faces of the mounting rail and the guide rail lie, as well as by the chamfers of the mounting rail and the guide rail. The wiper initially slides along the chamfer of the mounting rail, wherein it is possible for the wiper to lift off of the chamfer. Finally, at the lowest point of the triangle described, the wiper slides further along the chamfer of the guide rail until it reaches the lateral surface of the guide rail, i.e., its side faces and the top face. In this arrangement, the chamfers of the guide rail and the mounting rail are preferably mirror-symmetrical to one another; this means that the guide carriage is removed from the guide rail in the same way as it is mounted, without the wipers of the guide carriage hitting edges at the transition from the guide rail and the mounting rail.

In the case of the second type, the guide rail is provided with sharp-edged ends, i.e., without chamfers at the transition from the bearing face to the side faces and to the top face. In this case, the mounting rail is placed with its angular end against the bearing face of the guide rail. The side faces and top faces of the guide rail and mounting head lie on common planes. The transition from the mounting rail to the guide rail is smooth, i.e., free of edges. When the guide carriage is moved onto the guide rail, neither the wipers nor the rolling elements contact any edges. The rolling elements of the guide carriage can roll over this transition without damage and the front wipers do not get stuck.

To further facilitate the mounting process, the mounting rail can be provided at its axial ends, in each case, with a slot originating from the bearing face and extending towards the other axial end and radially inwards. When the guide carriage is pushed from the mounting rail onto the guide rail and the guide carriage passes over the mounting head, the mounting head can be pushed radially inwards in the region of the slot, however only as far as the guide carriage requires space. The slot can form resiliently deflectable tabs at the ends of the mounting rail, which can be deflected towards one another against a spring force.

Preferably, the slot is arranged parallel to the longitudinal axis and centrally in the mounting rail. This ensures an even deflection of the tabs.

Mounting heads can be formed at both ends of the mounting rail with the mounting contour adapted to the contour of the guide rail. These mounting heads can be provided with the slots described above, which form resiliently deflectable head tabs of the mounting head. The mounting rail can have a central section between the mounting heads for receiving the guide carriage, which can be designed as a parking section. The guide carriage placed on the mounting rail can be transported without rolling elements falling out of the guide carriage.

The parking section of the mounting rail can form a circumferential parking contour for the guide carriage, which is offset radially inwards with respect to the mounting contour. This reduction of the cross-section in the central section is dimensioned such that, on the one hand, the wipers mounted on the guide carriage are loaded as little as possible and, on the other hand, the rolling elements are held perfectly.

The mounting rail can be made of plastic and composed of two longitudinal parts, which are each made of plastic by means of injection molding. The longitudinally divided mounting rail enables an injection of the mold without undercuts. Once the longitudinal parts have been completed, they can be joined together, for example by gluing, or by a form-fitting connection using latches and snap-in lugs that were previously formed using the injection molding process.

This mounting rail can be hollow and its longitudinal parts can have thin-walled walls which form the top face and the side faces on their outer sides. Ideally, the thin-walled walls are of the same thickness to reduce internal stresses in the mounting rail caused by the production process. A mounting rail manufactured in this manner is lightweight.

BRIEF DESCRIPTION OF THE DRAWINGS

The disclosure is explained in more detail below with reference to two exemplary embodiments illustrated in nine figures. In the figures.

DETAILED DESCRIPTION

Figure 1:
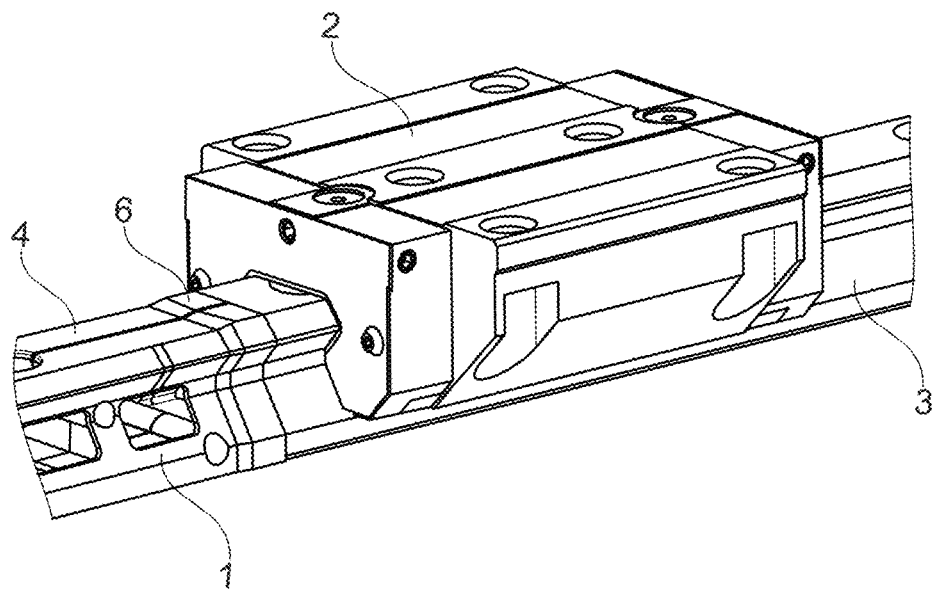
FIG. 1 shows a first exemplary embodiment in a perspective view, with a guide carriage with a sharp-edged guide rail and mounting rail.
Figure 2:
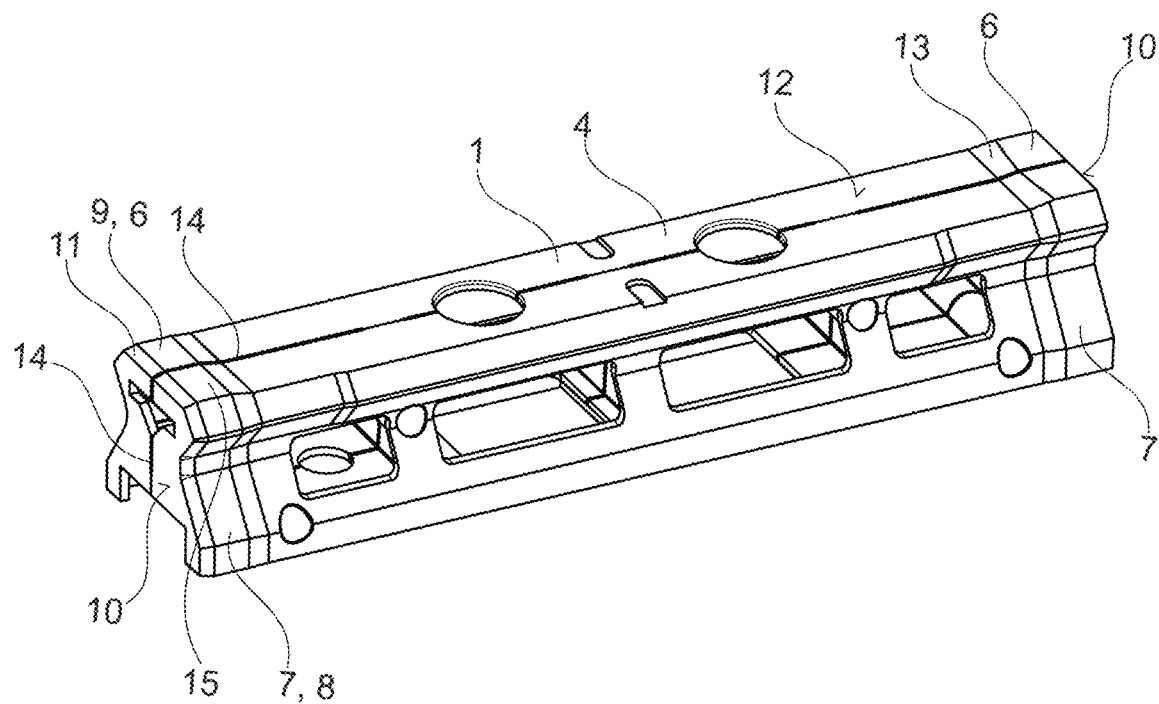
FIG. 2 shows the mounting rail from FIG. 1 in a perspective view.

FIGS. 1 and 2 show a first exemplary embodiment of a mounting rail 1 for mounting a guide carriage 2 of a linear guide onto a guide rail 3. The mounting rail 1 has a central section 4 for receiving the guide carriage 2, as well as mounting heads 6 located at both ends of the central section with a mounting contour 7 adapted to a contour of the guide rail 3.

The mounting contour 7 comprises mutually averted side faces 8 arranged along the longitudinal axis, as well as a top face 9 situated between the side faces 8, and bearing faces 10 situated at the ends of both mounting heads 6 and arranged transversely to the longitudinal axis for bearing against the mounting rail 1.

The one bearing face 10 has a chamfer 11 at the transition to the side faces 8 and to the top face 9 of the one mounting head 6. The other bearing face 10 directly adjoins the side faces 8 and the top face 9 of the other mounting head 6 at an angle of 90 degrees.

FIG. 1 shows that the mounting rail 1 is placed with its angular end against the guide rail 3, which also has an angular end. The mounting contour 7 is adapted to the contour of the guide rail 3 so that an edge-free transition between the two rails is ensured.

The central section 4 has a parking contour 12, which is offset radially with respect to the mounting contour 7. The edge-free transition from the parking contour 12 to the mounting contour 7 is implemented by means of ramps 13, which merge into the parking contour 12 on the one hand and into the mounting contour 7 on the other.

FIG. 2 clearly shows the formation of a slot 14 which originates from the bearing face and extends towards the other axial end and radially inwards. The slot 14 forms resiliently deflectable head tabs 15 on the mounting head 6, which can be deflected towards one another against a spring force. The slot 14 is aligned parallel to the longitudinal axis of the mounting rail and centrally in the mounting rail.

It can also be clearly seen from FIG. 2 that one end is angular and the other end is chamfered.

Figure 3:
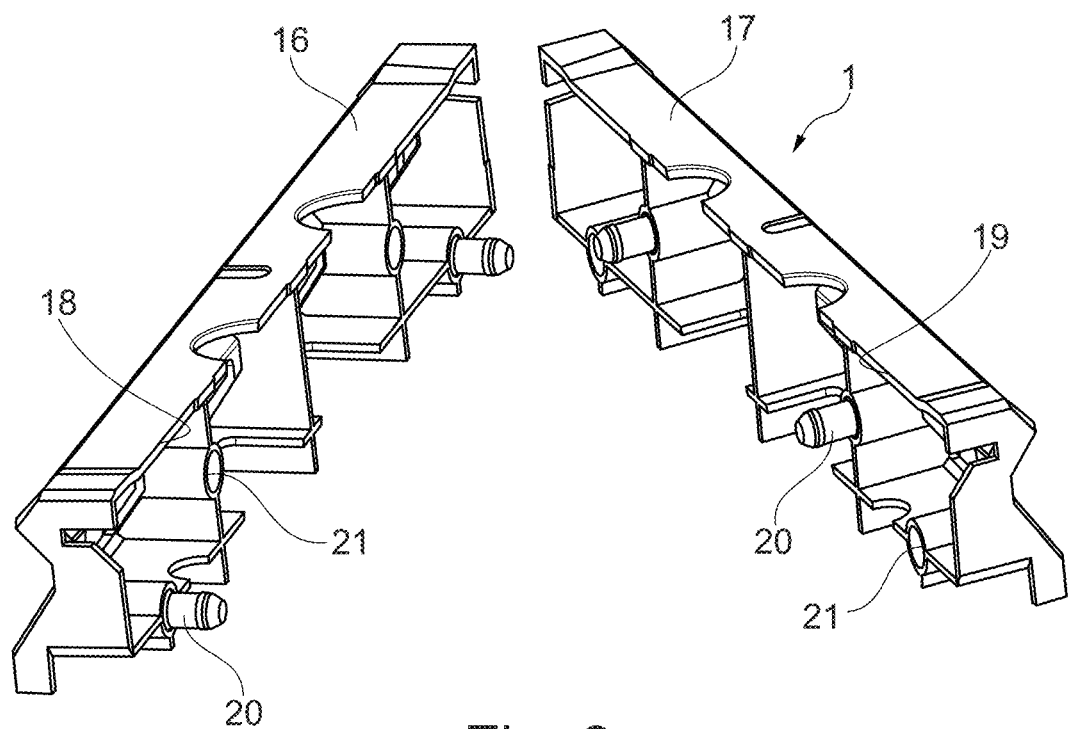
FIG. 3 shows individual parts of the mounting rail from FIG. 1.

FIG. 3 shows the hollow mounting rail 1, which in the exemplary embodiment is made of plastic by means of injection molding and is composed of two separately manufactured longitudinal parts 16, 17. The walls 18, 19 of the longitudinal parts 16, 17 are designed as thin-walled. The outer sides of the walls 18, 19 form the side faces 8 and the top face 9 described above. Both longitudinal parts 16, 17 are provided with plugs 20 and blind holes 21. The plugs 20 of both longitudinal parts 16, 17 are assigned one blind hole 21 each of the respective opposite longitudinal part 16, 17. When the two longitudinal parts 16, 17 are joined together, the plugs 20 engage in the blind holes 21.

Figure 4:
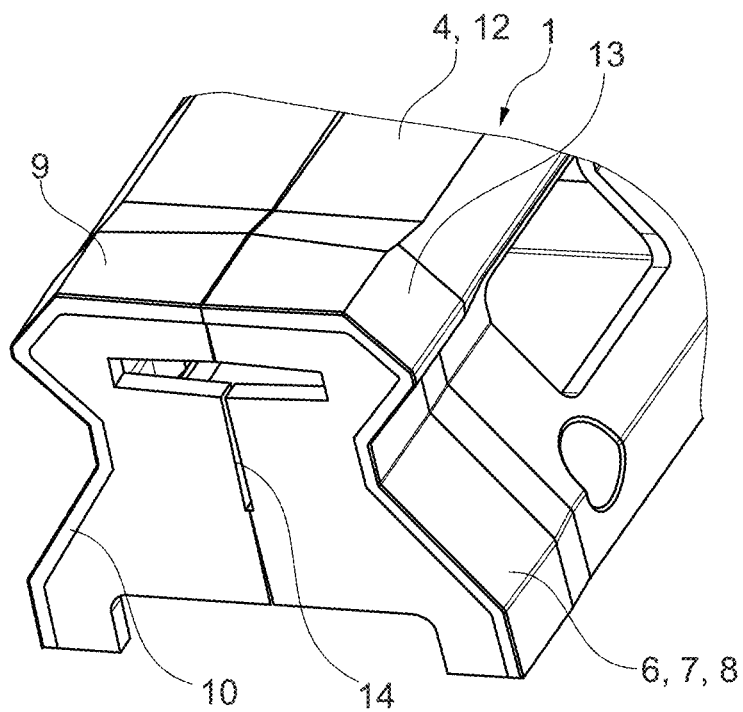
FIG. 4 shows one end of the mounting rail in a perspective view.

FIG. 4 shows the cut-out angular end of the mounting rail 1 with the bearing face 10, which is arranged transversely to the longitudinal axis and is set back somewhat axially at a radial distance from the mounting contour 7.

Figure 5:
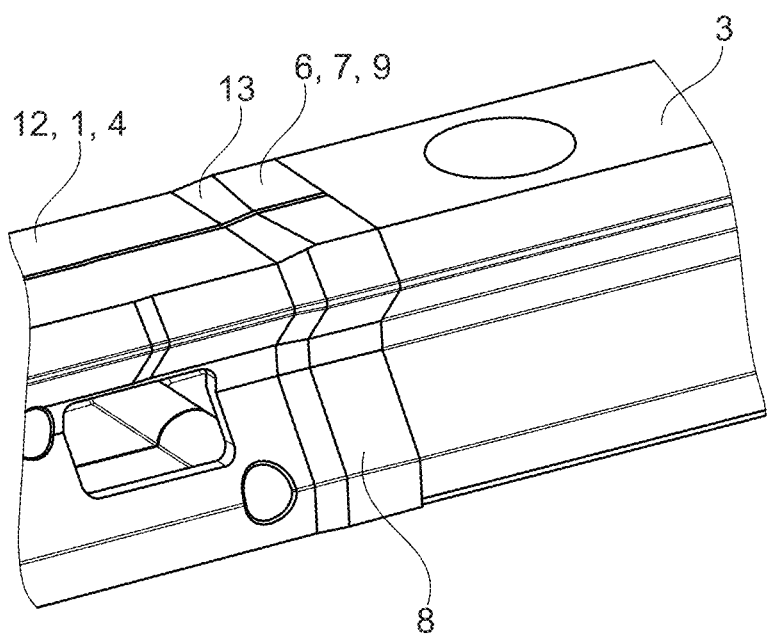
FIG. 5 shows an enlargement of a portion of FIG. 1.

FIG. 5 shows an enlargement of a section of FIG. 1. It can clearly be seen that the mounting rail 1 and the guide rail 3 are placed against one another with their angular ends.

Figure 6:
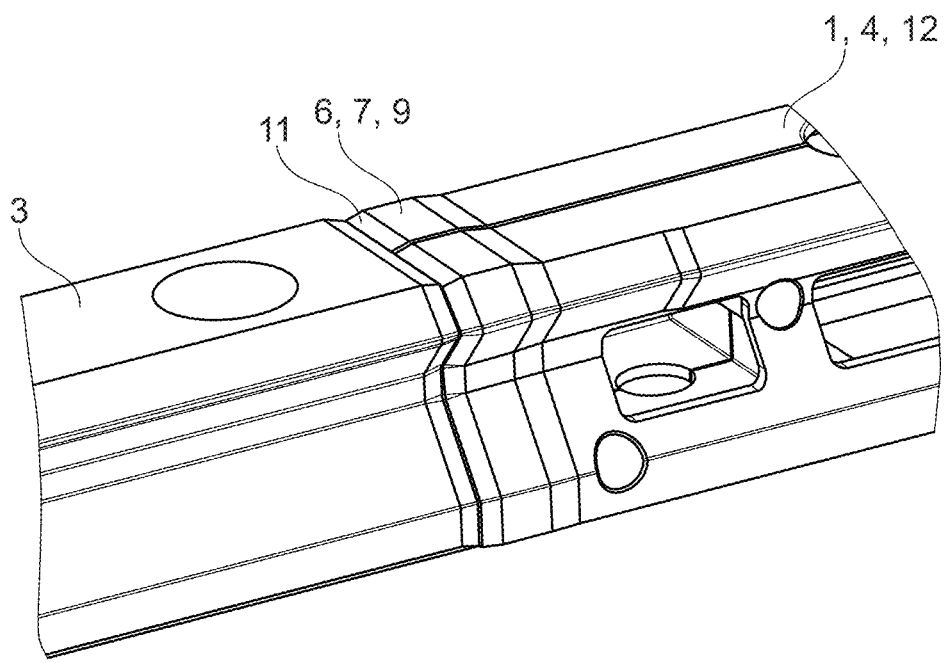
FIG. 6 shows a further exemplary embodiment in a similar representation to that of FIG. 5.

FIG. 6 shows a second exemplary embodiment in a similar representation to that of FIG. 5. Here, the guide rail 3 is chamfered at its ends. In this case, the mounting rail 1 is placed with its chamfered end against the guide rail 3.

Figure 7:
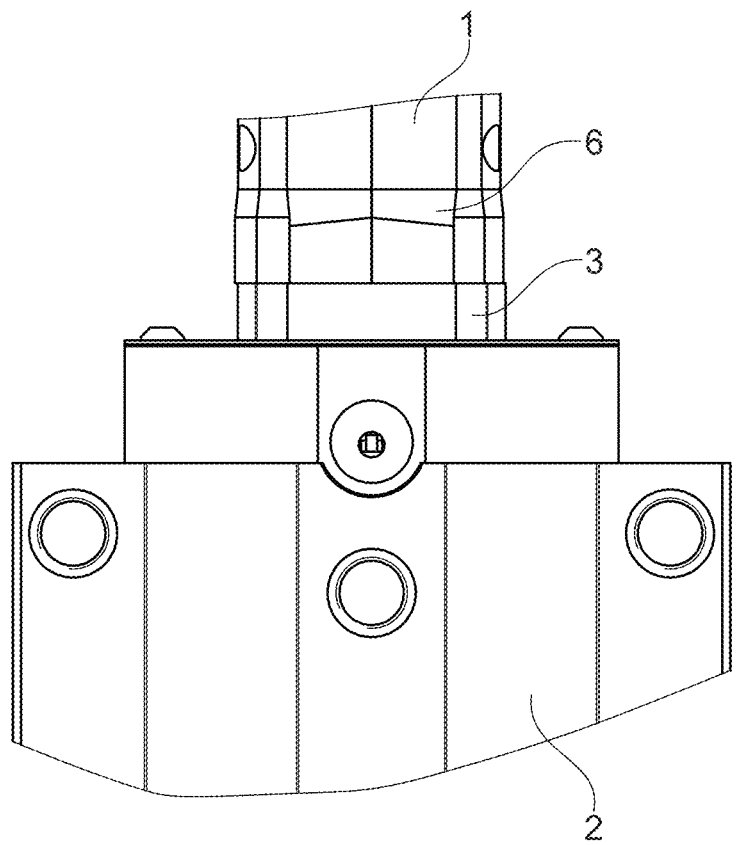
FIG. 7 shows a top view of the guide carriage with guide rail and mounting rail from FIG. 1.
Figure 8:
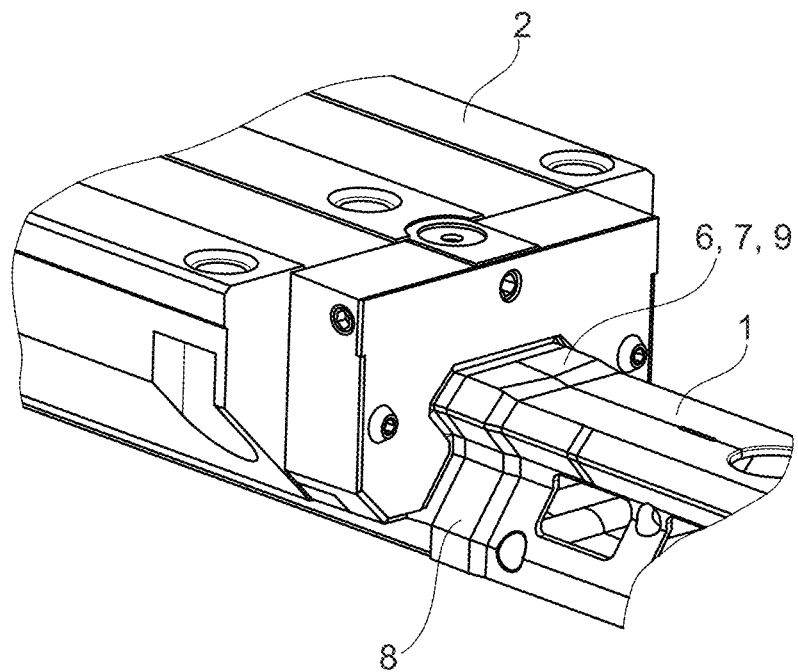
FIG. 8 shows a further perspective view of the first exemplary embodiment.

FIGS. 7 and 8 clearly show the transition from the guide rail 3 to the mounting rail 1 with the angular ends of both rails placed against one another.

Figure 9:
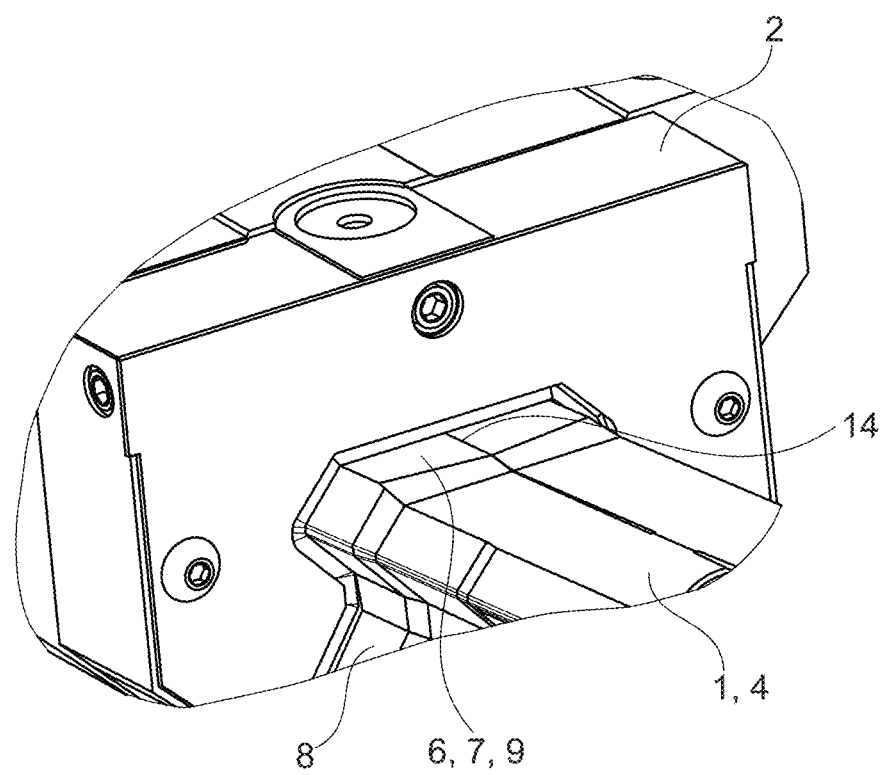
FIG. 9 shows an enlargement of a portion of FIG. 8.

FIG. 9 shows an enlargement of a section of FIG. 8. The slot 14 in the mounting head 6 of the mounting rail 1 can be clearly seen here.

LIST OF REFERENCE SIGNS

1 Mounting rail
2 Guide carriage

3 Guide rail
4 Central section
6 Mounting head
7 Mounting contour
8 Side face
9 Top face
10 Bearing face
11 Chamfer
12 Parking contour
13 Ramp
14 Slot
15 Head tab
16 Longitudinal part
17 Longitudinal part
18 Wall
19 Wall
20 Plug
21 Blind hole

The invention claimed is:

1. A mounting rail for mounting a guide carriage of a linear guide onto a guide rail, comprising:
side faces formed on sides of the mounting rail;
a top face situated between the side faces;
first and second bearing faces arranged at end sides of the mounting rail and extending transversely to a longitudinal axis of the mounting rail for bearing against the guide rail, wherein the first bearing face has a chamfer at the transition to the side faces and to the top face and the second bearing face adjoins the side faces and the top face at an angle of 90 degrees, wherein at least one of the first and second bearing faces defines a slot;
a central section for receiving the guide carriage; and
mounting heads located at both ends of the central section with the first and second bearing faces positioned at the end sides of the mounting heads, respectively.

2. The mounting rail of claim 1, wherein the slot forms resiliently deflectable head tabs of at least one of the mounting heads configured to be deflected towards one another.

3. The mounting rail of claim 1, wherein the slot is arranged centrally in the mounting rail.

4. The mounting rail of claim 1, wherein the central section forms a parking contour for the guide carriage, which is offset inwards with respect to a mounting contour of at least one of the mounting heads.

5. A mounting rail for mounting a guide carriage of a linear guide onto a guide rail, comprising:
first and second parts that cooperate to form bearing faces, side faces that extend longitudinally between the bearing faces, and a top face that extends between the side faces and longitudinally between the bearing faces, the first and second parts being coupled to each other, such that a slot is defined between the first and second parts, wherein the width of the slot varies along the length of the slot, such that portions of the first and second parts resiliently deflect toward each other to accommodate the guide carriage.

6. The mounting rail of claim 5, wherein the first and second parts cooperate to form mounting heads that include the bearing faces and a central section that extends longitudinally between the mounting heads, and wherein a contour of the central section is offset inwards of the contours of the mounting heads.

7. The mounting rail of claim 6, wherein the portions of the first and second parts that resiliently deflect toward each other form a portion of at least one of the mounting heads.

8. A mounting rail for mounting a guide carriage of a linear guide onto a guide rail, comprising:
side faces formed on sides of the mounting rail;
a top face situated between the side faces;
first and second bearing faces arranged at end sides of the mounting rail and extending transversely to a longitudinal axis of the mounting rail for bearing against the guide rail, wherein the first bearing face has a chamfer at the transition to the side faces and to the top face and the second bearing face adjoins the side faces and the top face at an angle of 90 degrees; and
two longitudinal parts, which are each made of plastic by means of injection molding.

9. The mounting rail of claim 8, wherein the longitudinal parts have walls that form the top face and the side faces and cooperate to define a hollow within the mounting rail.

10. A mounting rail for mounting a guide carriage of a linear guide onto a guide rail, comprising:
a first mounting head having a first mounting contour;
a second mounting head in a spaced relationship with the first mounting head and having a second mounting contour; and
a central section that extends longitudinally between the first and second mounting heads and has a parking contour that is offset inwards of the first and second mounting contours, such that load is reduced on wipers of the guide carriage and rolling elements of the guide carriage are retained while the guide carriage is positioned on the central section, wherein the first mounting head includes a first bearing face and the second mounting head includes a second bearing face, and wherein side faces and a top face that extends between the side faces extend from the first bearing face to the second bearing face, wherein the first bearing face has a chamfer at the transition to the side faces and top face, wherein the second bearing face adjoins the side faces and top face at an angle of 90 degrees.

11. A mounting rail for mounting a guide carriage of a linear guide onto a guide rail, comprising:
a first mounting head having a first mounting contour;
a second mounting head in a spaced relationship with the first mounting head and having a second mounting contour; and
a central section that extends longitudinally between the first and second mounting heads and has a parking contour that is offset inwards of the first and second mounting contours, such that load is reduced on wipers of the guide carriage and rolling elements of the guide carriage are retained while the guide carriage is positioned on the central section, wherein the first mounting head includes a first bearing face and the second mounting head includes a second bearing face, and wherein side faces and a top face that extends between the side faces extend from the first bearing face to the second bearing face, and wherein at least one of the first bearing face and the second bearing face defines a slot that is configured to allow resilient deformation of a first part of the mounting rail relative to a second part of the mounting rail that is coupled to the first part.

* * * * *